Jan. 13, 1925.

R. E. DOHERTY 1,523,004

DYNAMO ELECTRIC MACHINE

Filed Nov. 21, 1923

Inventor:
Robert E. Doherty,
by Alexander S. ⟨signature⟩
His Attorney

Patented Jan. 13, 1925.

1,523,004

UNITED STATES PATENT OFFICE.

ROBERT ERNEST DOHERTY, OF SCOTIA, NEW YORK, ASSIGNOR TO GENERAL ELECTRIC COMPANY, A CORPORATION OF NEW YORK.

DYNAMO-ELECTRIC MACHINE.

Application filed November 21, 1923. Serial No. 676,151.

*To all whom it may concern:*

Be it known that I, ROBERT E. DOHERTY, a citizen of the United States, residing at Scotia, in the county of Schenectady, State of New York, have invented certain new and useful Improvements in Dynamo-Electric Machines, of which the following is a specification.

My invention relates to dynamo electric machines and particularly to such machines having commutated armature windings.

It is well known that the commutation of direct current dynamo electric machines can be greatly improved by providing them with commutating poles having windings which not only neutralize the armature reaction in the commutating zone, but also produce a commutating field. Even in such machines, however, commutation is often disturbed by stray magnetic fields in the commutating zone. In accordance with my invention I provide means for preventing these stray magnetic fields from entering the armature in the commutating zone.

Figure 1:
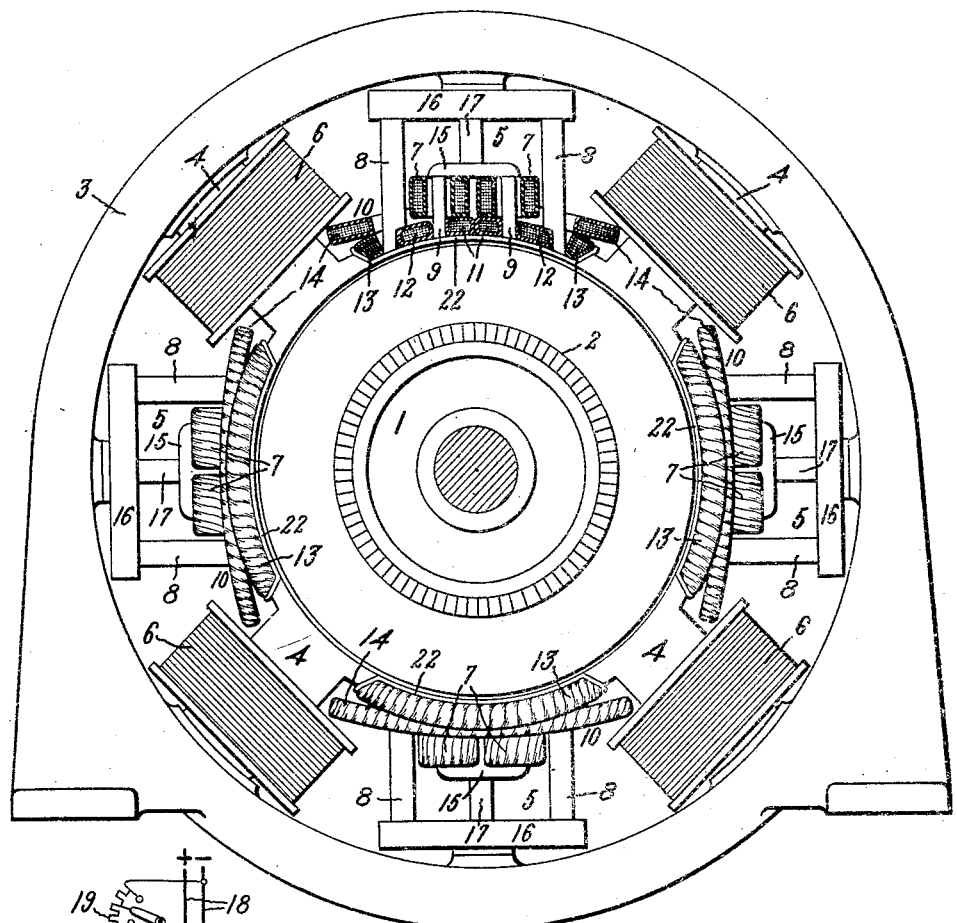
Figure 2:
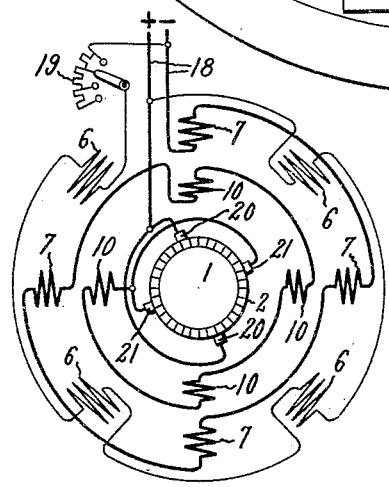

Other features of novelty which characterize my invention are pointed out in the claims annexed to and forming a part of this specification. For a better understanding of my invention, reference may be had to the following description taken in connection with the accompanying drawing, in which Fig. 1 is an end view partly in section of a dynamo electric machine embodying my invention and Fig. 2 is a diagram of connections of the machine of Fig. 1.

In the drawing, the dynamo electric machine has an armature 1 provided with a commutator 2, and a field frame 3 provided with main poles 4 and commutating poles 5. The main poles are provided with exciting windings 6 and the commutating poles are provided with commutating windings 7. A magnetic shield comprising magnetic members 8 located outside of the commutating winding on each commutating field pole is provided for preventing stray fields from entering the armature in the commutating zone.

The magnetic shield is shown as a U-shaped member having the ends of the U towards said armature, the legs of the U being formed by the members 8. The commutating poles comprise two legs 9 separated from one another with the commutating windings 7 mounted on each leg. The field member is also provided with a compensating winding 10 comprising coils 11, 12, 13 and 14 located near the surface of the armature and about the ends of the legs 9 of the commutating poles and the legs 8 of the U-shaped member. Compensating windings may also be placed in the pole faces of the main poles 4 to prevent distortions of the main flux, as is usual in direct current machines.

In order to dampen out the flux tooth ripples and thus improve commutation, I preferably provide continuous non-magnetic members 22 between the commutating poles 5 and the armature 1. In the particular arrangement shown, these members are made of copper, are dish-shaped and hold in place the coils of the compensating winding 10.

The legs 9 of the commutating poles are connected together at their ends away from the armature by a magnetic member 15, which is in turn supported from the cross-member 16 of the magnetic shield by a non-magnetic member 17.

In the diagram of connections, the supply mains 18 are shown as having connected across them the exciting windings 6, in the circuit of which is a regulating rheostat 19. One of the mains 18 is shown as connected to the positive brushes 20 bearing on the commutator 2 and the other main is shown as connected to the negative brushes 21, the commutating field winding 7 and the compensating field winding 10 being in series with this supply main.

The main poles 4 have a small pole arc so that the neutral or compensating zone is a wide one. The compensating winding 10 is designed so as to neutralize the armature reaction and the commutating winding 7 is designed to produce a commutating field flux which flows out of one of the legs 9, through that portion of the armature in which the coil or coils undergoing commutation are located, back through the other leg of the same commutating pole, and thence through the magnetic member 15. Any stray field set up by the main poles 4, which would in the ordinarily constructed field member tend to enter the armature in the commutating zone under the commutating poles, is prevented by my construction and flows instead through the U-shaped magnetic shield, that is, through one of the legs 8, through the cross-member 16, through the other leg 8 of the same shield into the next adjacent main pole. By providing the non-magnetic support 17 for the commutating poles, there is no tendency for the path of the commutating pole flux to be disturbed by this magnetic shield.

By my construction, a very wide neutral or commutating zone is produced, and if, for any reason, the brushes are not set in exactly the middle of the neutral zone, or there is a shifting of the neutral zone with changes of load, sparkless commutation may still be obtained.

I desire it to be understood that my invention is not limited to the particular arrangement shown and described, and I aim in the appended claims to cover all modifications which do not depart from the spirit and scope of my invention.

What I claim as new and desire to secure by Letters Patent of the United States, is:

1. In a dynamo electric machine, an armature provided with a commutator, main field poles having exciting windings thereon, commutating field poles having commutating windings thereon, and means for preventing stray magnetic fields from entering said armature in the commutating zone.

2. In a dynamo electric machine, an armature provided with a commutator, main field poles having exciting windings thereon, commutating field poles having commutating windings thereon, and a magnetic shield for each of said commutating field poles for preventing stray magnetic fields from entering said armature in the commutating zone.

3. In a dynamo electric machine, an armature provided with a commutator, main field poles having exciting windings thereon, commutating field poles having commutating windings thereon, and magnetic members located outside of said commutating winding on each of said commutating field poles and acting as a shield for preventing stray magnetic fields from entering said armature in the commutating zone.

4. In a dynamo electric machine, an armature provided with a commutator, main field poles having exciting windings thereon, commutating field poles having commutating windings thereon, and a U-shaped magnetic member for each of said commutating field poles having the ends of the U toward said armature, the legs of said U-shaped member being located outside of the said commutating winding and acting as a shield for preventing stray magnetic fields from entering said armature in the commutating zone.

5. In a dynamo electric machine, an armature provided with a commutator, main field poles having exciting windings thereon, commutating field poles, each of said commutating field poles comprising two legs separated from one another, commutating field windings thereon, and magnetic members located outside of said commutating windings on each of said commutating field poles and acting as a shield for preventing stray magnetic fields from entering said armature in the commutating zone.

6. In a dynamo electric machine, an armature provided with a commutator, main field poles having exciting windings thereon, commutating field poles, each of said commutating field poles comprising two legs separated from one another, commutating field windings thereon, magnetic members located outside of said commutating windings on each of said commutating field poles and acting as a shield for preventing stray magnetic fields from entering said armature in the commutating zone, and compensating windings located near the surface of said armature and about the ends of said legs of said commutating field poles and the ends of said magnetic members.

7. In a dynamo electric machine, an armature provided with a commutator, main field poles having exciting windings thereon, commutating field poles, each of said commutating field poles comprising two legs separated from one another, commutating field windings thereon, and a U-shaped magnetic member for each of said commutating field poles having the ends of the U toward said armature, the legs of said U-shaped member being located outside of said commutating windings and acting as a shield for preventing stray magnetic fields from entering said armature in the commutating zone.

8. In a dynamo electric machine, an armature provided with a commutator, main field poles having exciting windings thereon, commutating field poles, each of said commutating field poles comprising two legs separated from one another, commutating field windings thereon, a U-shaped magnetic member for each of said commutating field poles having the ends of the U toward said armature, the legs of said U-shaped member being located outside of said commutating windings and acting as a shield for preventing stray magnetic fields from entering said armature in the commutating zone, and compensating windings located near the surface of said armature and about the ends of said legs of said commutating field poles and said legs of said U-shaped member.

9. In a dynamo electric machine, an armature provided with a commutator, main field poles having exciting windings thereon, commutating field poles, each of said commutating field poles comprising two legs separated from one another, non-magnetic supports for said commutating field poles, commutating field windings thereon, and magnetic members located outside of said commutating windings on each side of said commutating field poles and acting as a shield for preventing stray magnetic fields from entering said armature in the commutating zone.

10. In a dynamo electric machine, an armature provided with a commutator, main field poles having exciting windings thereon, commutating field poles, each of said commutating field poles comprising two legs separated from one another, non-magnetic supports for said commutating field poles, commutating field windings thereon, magnetic members located outside of said commutating windings on each of said commutating field poles and acting as a shield for preventing stray magnetic fields from entering said armature in the commutating zone, and compensating windings located near the surface of said armature and about the ends of said legs of said commutating field poles and the ends of said magnetic members.

11. In a dynamo electric machine, an armature provided with a commutator, main field poles having windings thereon, commutating field poles, each of said commutating field poles comprising two legs separated from one another, non-magnetic supports for said commutating field poles, commutating field windings thereon, and a U-shaped magnetic member for each of said commutating field poles having the ends of the U toward said armature, the legs of said U-shaped member being located outside of said commutating windings and acting as a shield for preventing stray magnetic fields from entering said armature in the commutating zone.

12. In a dynamo electric machine, an armature provided with a commutator, main field poles having exciting windings thereon, commutating field poles, each of said commutating field poles comprising two legs separated from one another, non-magnetic supports for said commutating field poles, commutating field windings thereon, a U-shaped magnetic member for each of said commutating field poles having the ends of the U toward said armature, the legs of said U-shaped member being located outside of said commutating windings and acting as a shield for preventing stray magnetic fields from entering said armature in the commutating zone, and compensating windings located near the surface of said armature and about the ends of said legs of said commutating field poles and said legs of said U-shaped member.

13. In a dynamo electric machine, an armature provided with a commutator, main field poles having exciting windings thereon, commutating field poles having commutating windings thereon, and continuous non-magnetic members between said commutating poles and said armature for damping out the flux tooth ripples.

In witness whereof, I have hereunto set my hand this 20th day of November, 1923.

ROBERT ERNEST DOHERTY.